United States Patent
Nothnagle et al.

[15] 3,687,520
[45] Aug. 29, 1972

[54] SUBSTAGE ILLUMINATING MIRROR FOR A STEREOMICROSCOPE

[72] Inventors: Paul E. Nothnagle, Rochester; Harold E. Rosenberger, Brighton, both of N.Y.

[73] Assignee: Bausch & Lomb Incorporated, Rochester, N.Y.

[22] Filed: Feb. 19, 1971

[21] Appl. No.: 117,140

Related U.S. Application Data

[63] Continuation of Ser. No. 788,456, Jan. 2, 1969, abandoned.

[52] U.S. Cl. .................. 350/87, 350/35, 350/36, 350/235, 350/300
[51] Int. Cl. ............................................. G02b 21/06
[58] Field of Search......350/35, 36, 87, 91, 235, 292, 350/300, 302, 288; 240/2

[56] References Cited

UNITED STATES PATENTS

| | | |
|---|---|---|
| 3,196,742 | 7/1965 | Sparling................350/35 X |
| 2,579,177 | 12/1951 | Miles...................350/174 X |
| 2,971,080 | 2/1961 | Boughton.............350/300 X |

Primary Examiner—David Schonberg
Assistant Examiner—Toby H. Kusmer
Attorney—Frank C. Parker and Bernard L. Sweeney

[57] ABSTRACT

An illuminating mirror for use in the substage of a stereomicroscope is described including a glass-wedge having the front surface coated to partially reflect and partially transmit an incident beam of light. The rear surface of the wedge is coated to be totally reflective from both sides. Therefore, the transmitted and refracted beam is reflected back through the front surface to form a second beam oblique to the former reflected beam. The two beams are then used to individually illuminate the two optical axes of the stereomicroscope. A diffusing reflector may be provided on the other side of the mirror which also utilizes the totally reflective rear surface of the wedge.

10 Claims, 10 Drawing Figures

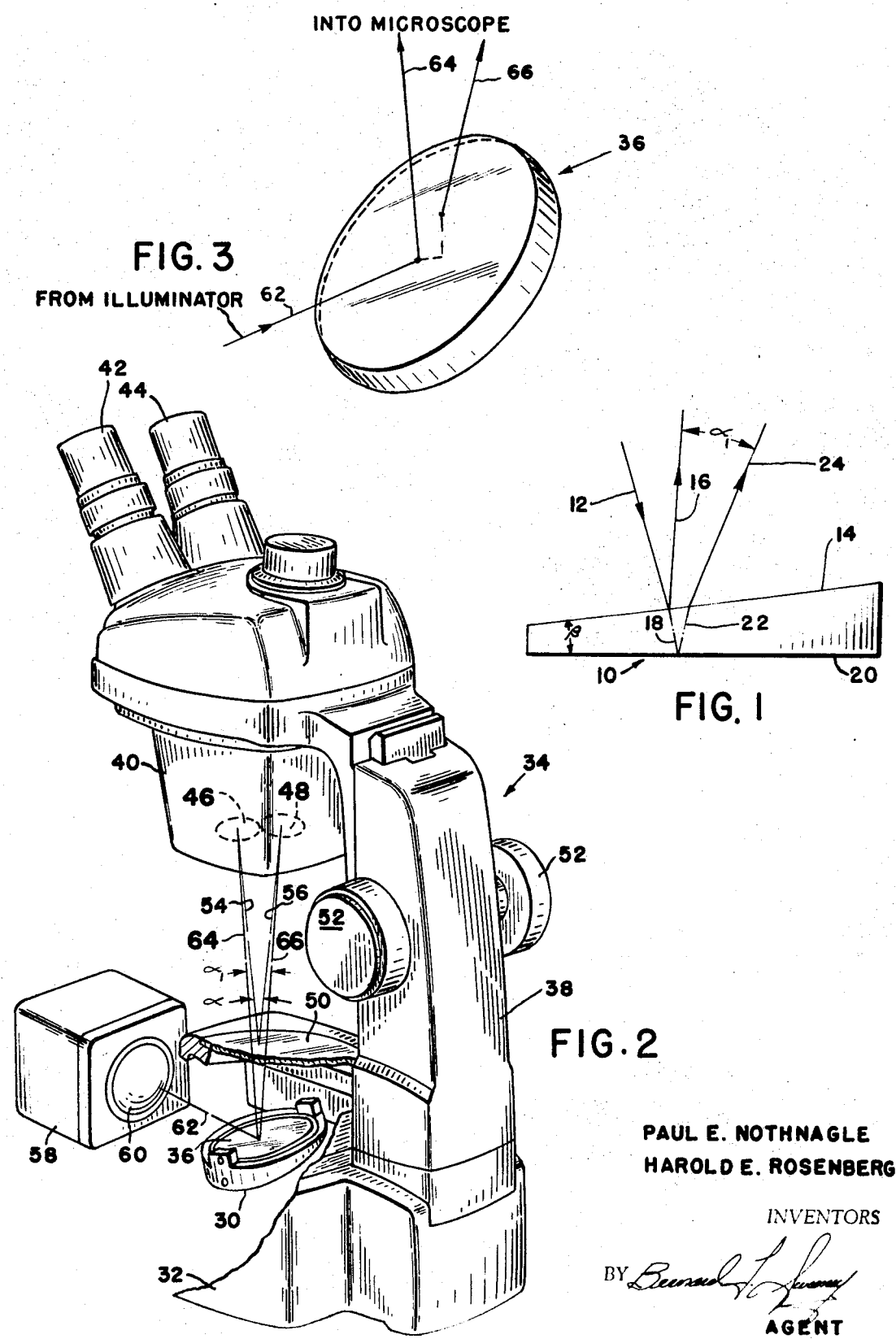

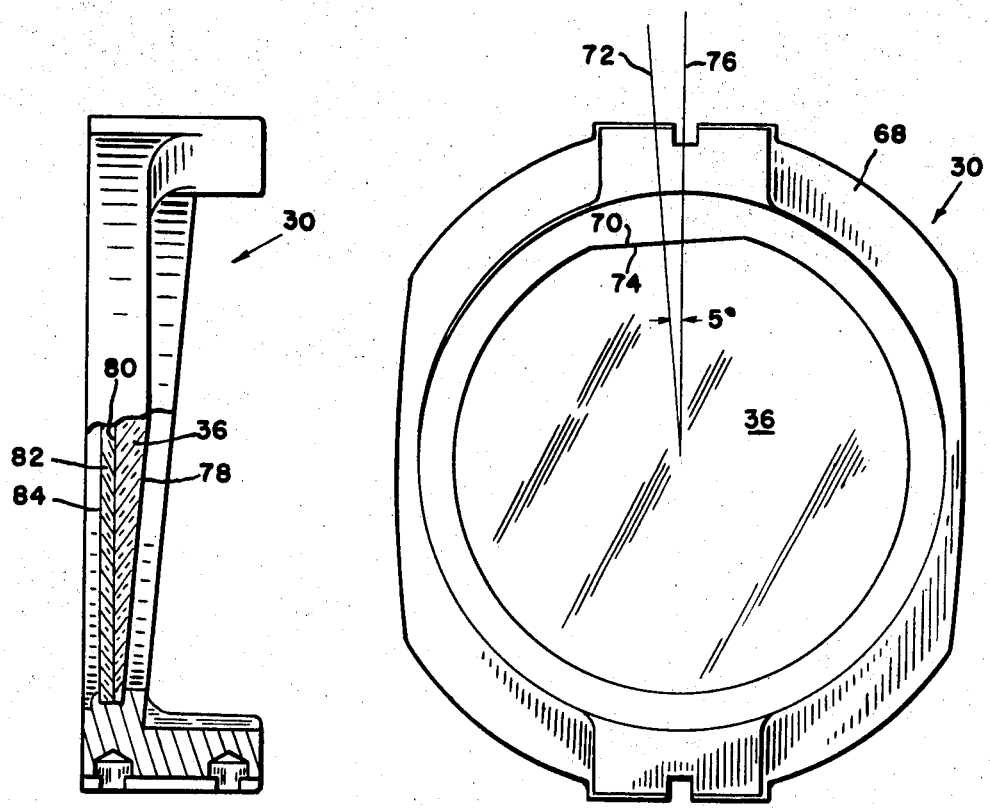

PATENTED AUG 29 1972 3,687,520
SHEET 3 OF 4
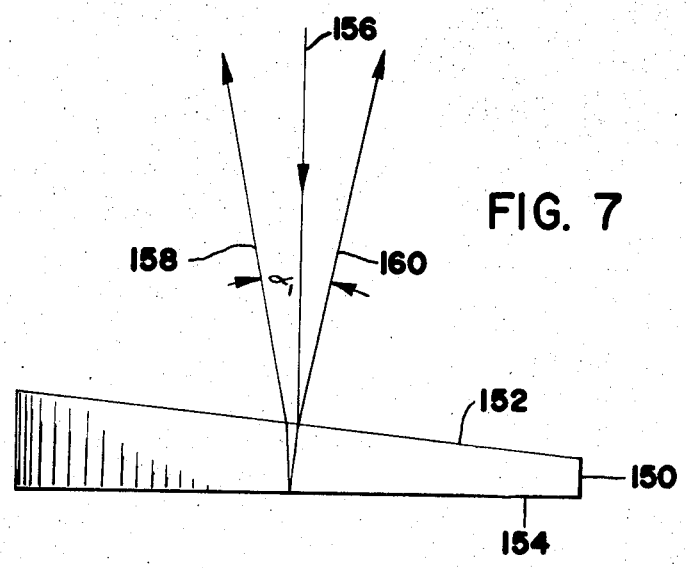
FIG. 7
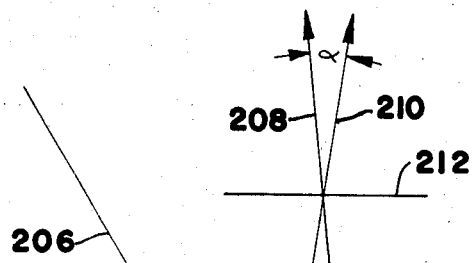
FIG. 8
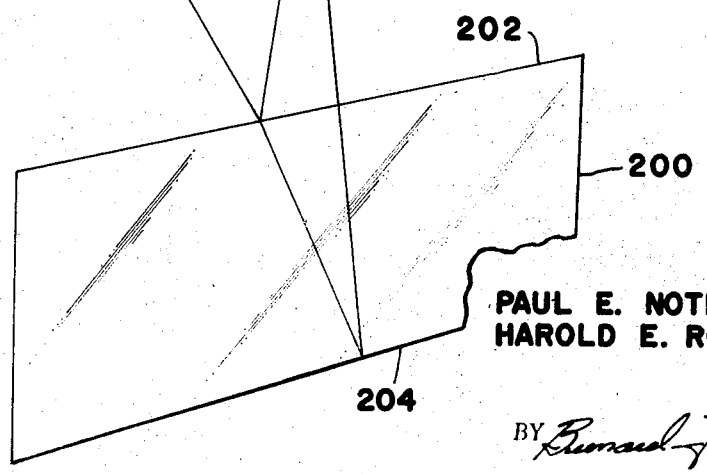
PAUL E. NOTHNAGLE
HAROLD E. ROSENBERGER
INVENTORS
BY
AGENT

PATENTED AUG 29 1972  3,687,520

PAUL E. NOTHNAGLE
HAROLD E. ROSENBERGER
INVENTORS

BY
AGENT

SUBSTAGE ILLUMINATING MIRROR FOR A STEREOMICROSCOPE

CROSS-REFERENCES TO RELATED APPLICATIONS

This is a continuation of our previous application, Ser. No. 788,456 filed Jan. 2, 1969, now abandoned.

BACKGROUND OF THE INVENTION

This invention is related to illuminating mirrors for stereomicroscopes and is more particularly concerned with such mirrors which are used in the substage of stereomicroscopes which provide a pair of beams of light of substantially equal intensity along the two optical axes of the stereomicroscopes.

Many types of substage illumination systems for stereomicroscopes have been developed in the past. In particular, the technique of providing a bright cone of light centered on the centerline of the stereomicroscope has been used to illuminate the specimen. The optical axes of the stereomicroscope are then located near the fringes of this cone and are thereby equally illuminated. However, this means is extremely inefficient and cumbersome. Most of the light passes through the specimen plane and between the optical axes thereby providing a source of stray light rays which eventually may interfere with the viewing of the specimen.

A second well-known technique is to reflect a diffused beam of light with a concave mirror located below the specimen plane to again provide a light cone as above. The same difficulties again occur.

In addition, many sophisticated optical systems have been developed to provide good substage illumination in a stereomicroscope. However, these systems are expensive to produce and; therefore, are restricted to use on higher cost equipment.

The present invention makes use of an optical wedge or prism which is partially reflective on one face and totally reflective on the other faces to form a pair of equal intensity output beams which are separated from each other by the degree required by the specific stereomicroscope for which the mirror is to be used as an accessory.

Optical wedges of this general type have been used previously in the optical arts, particularly in attempts to provide stereoscopic projection unaided by complementary filters such as those used in photogrammetric projectors and three-dimensional movies. However, these devices suffer in general from the appearance of multiple images being presented to a large aperture viewing system. The definition afforded by such systems is, in general, quite poor.

SUMMARY OF THE INVENTION

Accordingly, it is an object of the present invention to provide an illuminating mirror for use in the substage of a stereomicroscope which produces a pair of output beams of light which may be aligned with the optical axes of a stereomicroscope.

It is a second object to provide such a mirror which is of simple construction and inexpensive but which is compatible in performance with stereomicroscopes of the highest quality.

It is another object to provide such a mirror which when combined with a ground glass plate provides a diffusing reflector integral with the stereo-mirror.

Briefly, the invention in its broadest aspect is an illuminating mirror for the substage of a stereomicroscope which has a pair of intersecting optical axes, the axes intersecting in the specimen plane of the stereomicroscope, the axes being separated by the angle $\alpha$. The mirror comprises the combination of at least first and second plano optical surfaces. The first surface has optical properties sufficient to cause a beam of light which strikes the first surface to be partially reflected in the amount R and partially transmitted in the amount T. The relationship of T and R is given by the following mathematical expression, $$T^2 = R$$

The other surfaces are located after the first surface and are successively oblique to the transmitted portion of the beam. The additional surfaces are totally reflective to the transmitted portion of the beam of light so that the transmitted portion of the beam upon being partially retransmitted through the first optical surface is transverse to the reflected portion of the beam of light, at an angle of approximately $\alpha$ to the reflected portion, and of substantially equal intensity as the reflected portion.

Further objects, advantages, and features of the invention will be apparent in the arrangement and construction of the constituent parts in detail as set forth in the following specification taken together with the accompanying drawing.

DESCRIPTION OF THE DRAWING

In the drawing,

FIG. 1 is a schematic representation of an optical wedge showing the principles used in the mirror, FIG. 2 is an isometric view of a stereomicroscope and illuminator, the stereomicroscope being partially broken away to show the mirror embodying the invention, FIG. 3 is a perspective view of an optical wedge showing the ray paths for the two illuminating beams when positioned as shown in FIG. 2, FIG. 4 is an enlarged plan view of a mirror embodying the invention, FIG. 5 is an enlarged side view partially in section of the mirror shown in FIG. 4, FIG. 6 is a schematic representation, in section, of a second embodiment of the invention and also showing a diffusing reflector integrated into the mirror mount, FIG. 7 is a schematic representation of the optical wedge shown in FIG. 1 with the incident light beam being centered between the illuminating beams, FIG. 8 is a schematic representation of a third embodiment of the invention.

DETAILED DESCRIPTION OF THE PREFERRED EMBODIMENTS

Figure 9:
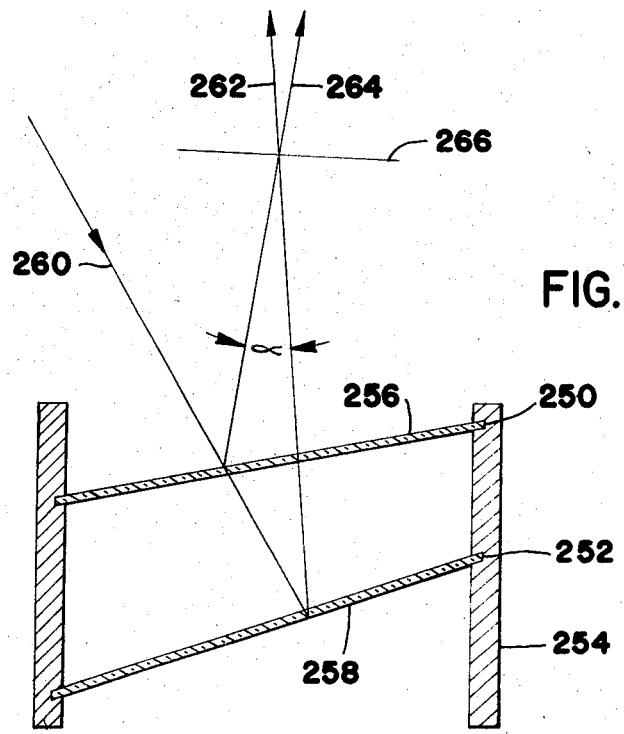
FIG. 9 is a schematic representation, in section, of a fourth embodiment of the invention.

Throughout the following description of the invention, the device will be referred to as a "mirror." This term is not strictly accurate as a plurality of reflecting surfaces are employed in the device rather than the single reflecting surface of the conventional mirror. However, the device replaces a mirror of the conventional variety and will undoubtedly become known as a mirror. In addition, use of the nomenclature should tend to make the description more understandable to those skilled in the art.

In referring to the various views of the drawing, identical reference numerals refer to identical parts or elements of the device. Referring now to FIG. 1, wherein there is shown an optical wedge indicated generally by the reference numeral 10. An input beam of light 12 strikes the first surface 14 of the wedge 10. Surface 14 has the optical properties to partially reflect the input beam 12, the reflected beam 16 being of a percentage intensity R. The remainder of beam 12, of percentage of intensity T, is transmitted through surface 14 and is refracted by the glass of wedge 10 to form beam 18. Beam 18 strikes the second surface 20 of the wedge 10. Surface 20 is totally reflective and beam 18 is reflected thereby to form a second reflected beam 22. When beam 22 reaches surface 14, some of the light is reflected downwardly; however, the percentage T of the light is transmitted therethrough and is refracted at the air-glass interface to form a second output beam 24. Beam 24 is divergent by an angle $\alpha_1$ with respect to beam 16 where $\alpha_1$ is dictated by the particular stereomicroscope for which the mirror is intended. The divergence $\alpha_1$ is a function of the angle of inclination $\beta$ of surface 14 to surface 20, and the material of wedge 10. The angle and materials may be ascertained using well-known optical principles by those skilled in the art for any particular application.

The amounts of light to be transmitted and reflected by surface 14 are determined by the following mathematical expression $$T^2 = R$$

When this relationship is adhered to the resultant beams 16 and 24 are of equal intensity. It will be noted that because of the partially reflective nature of surface 14, a number of additional output beams at other angles of divergence are also formed, but due to the size of the entrance pupils of the stereomicroscope, these beams may be ignored as they do not enter the pupils.

FIG. 2 shows a substage mirror 30, according to the invention, housed in the base 32 of a typical stereomicroscope 34. The base 32 has been cut away to show the mirror 30 in the operative position. Means, not shown, are provided in the base 32 for rotatably adjusting the mirror 30 for proper positioning. FIG. 3, while schematic in nature, shows the wedge 36 in position and provides a better illustration of the relationship of the input and output beams and the geometry of the wedge.

The stereomicroscope 34 is composed of a base 32, an arm 38, and a pod 40 which contains the optics of the stereomicroscope 34 supported by the arm 38. The optical elements are not shown with the exception of the objective lenses 46 and 48 and the associated eyepieces 42 and 44, respectively. The base 32 is stationary and includes a clear glass specimen plate 50. The pod 40 is slidably mounted to the arm 38 and the focusing of the optics is performed by the focus control knobs 52 which are connected to internal mechanical means, not shown. The stereomicroscope optics establish a pair of optical axes 54 and 56 which are separated by the angle $\alpha$, and which intersect at the specimen surface 50. In this embodiment, $\alpha_1$ is slightly different from $\alpha$ for reasons that will be explained more fully hereinbelow.

Also shown is an illuminator 58 which has a diffusing plate 60 through which the illuminating beam 62 is emitted. Beam 62 is incident on mirror 30 at approximately a 45° angle. The mirror 30 divides the beam 62 into two output beams 64 and 66 which are nearly parallel to and closely adjacent to optical axes 54 and 56 respectively; beams 64 and 66 cross the optical axes 54 and 56 near the entrance pupils of the stereomicroscope which are coincident with the objective lenses 46 and 48, respectively. The beam 62 is divided in the manner described hereinabove. It can be noted that the angle $\alpha_1$ between the light beams 64 and 66 is slightly smaller than the angle $\alpha$ between the optical axes 54 and 56. However, this small divergence does not have a significant effect on the overall performance of the stereomicroscope.

FIGS. 4 and 5 show enlarged views of the mirror 30 shown in FIG. 2. The wedge 36, which in this practical embodiment is cut into a circular form, is mounted in a retaining mount 68. In order to properly orient the wedge 36 in the mount 68, a flat 70 is cut on the wedge 36 normal to the axis of the wedge 72. This flat 70 is matched with a flat 74 in the mount 68. The stereomicroscope for which this particular mirror is designed has a separation of the optical axes $\alpha$ equal to 10°, therefore, approximately a 5° inclination of the wedge axes 72 to the mount axis of rotation 76 is necessary in order to properly orient the output beams.

The wedge 36 has a first optical surface 78 which is coated with titanium dioxide sufficient to provide approximately 34% reflectivity. This is lower than the amount determined by the aforementioned equation; however, this percentage allows for a certain amount of absorption by the glass and the approximately 88% reflectivity afforded by the aluminized rear surface 80 which is inclined to the front surface 78 by an angle of approximately 6°. The aluminized surface is chosen for two primary reasons over the traditional silvered mirror surface. First, it is less expensive; and secondly, it, because now both sides of the coating are reflective, allows for the mounting of a glass plate 82 having a ground glass surface 84 on the outside, directly against the rear of aluminized surface 80 to form a conventional diffusing reflector. This further reduces the cost of such a mirror because the plate 82 does not have to also have a reflective coating on its rear surface, the single aluminized surface is sufficient for both reflectors.

Referring now to FIG. 6, there is shown a second embodiment of the invention. Two thin glass plates 110 and 112 are held inclined to one another in a mount 114. The upper surface 116 of plate 110 is partially reflective in the manner described. Similarly, the lower surface 118 of plate 112 is totally reflective. An input beam 120 is divided into a pair of equal intensity output beams 122 and 124. However, by using plates rather than the wedge, no refraction of the transmitted beam occurs; therefore, the geometry is greatly simplified. In a manner similar to that described hereinabove, a diffusing reflector may be formed by placing a ground plate 126 against the rear of surface 118. It is clear that either surface of plates 110 and 112 may have the coatings applied thereto without sacrificing performance of the stereo-mirror.

Referring now to FIG. 7, there is shown a schematic representation of an optical wedge 150 similar to the one shown in FIG. 1. The optical wedge 150 has a partially reflecting first surface 152 and a totally reflecting second surface 154 which serve to divide the input light beam 156 into a pair of equal intensity output beams 158 and 160 in the manner described hereinabove. This figure is included herein to show that the input light beam may originate between the output beams, such as would occur if the input beam originated from a source centrally located in the pod.

In describing the mirror of the invention with reference to the aforementioned figures, the output light beams have always intersected the optical axes of the stereomicroscope near the entrance pupils. It is also within the scope of the invention to provide mirror means which provide a pair of output beams which may be coaxially aligned with the optical axes of the particular stereomicroscope for which the mirror is intended.

Referring now to FIG. 8, there is shown a schematic representation of such a mirror. This mirror comprises an optical wedge 200 having a first, partially reflecting surface 202 and a second, totally reflecting surface 204 which again divide the beam in the manner described hereinabove. However, it will be noted that in this embodiment, the convergence of the planes which include surfaces 202 and 204 with respect to the input beam 206 is in the opposite sense to the convergence of the surfaces 14 and 20 of wedge 10 with respect to the input beam 12 in FIG. 1. By altering the direction of convergence with respect to the input beam, the generated output beams 208 and 210 now converge initially upon leaving surface 202 and intersect at location of the stereomicroscope specimen plane 212. The output beams are now separated by the angle $\alpha$, which depends on the stereomicroscope, and may be aligned coaxially with the optical axes of the stereomicroscope.

This mirror, while theoretically superior to the mirror of FIGS. 1–6, is only slightly better in optical performance as long as the difference between $\alpha$ and $\alpha_1$ remains small. However, as can be seen from the figures, the mirror of FIG. 7 is considerably thicker and more bulky than is the mirror of FIGS. 1–6. In addition, wedge 200 does not readily lend itself to dual usage of the rear surface to provide a diffusing reflector as does wedge 10, and due to the angle of the incident beam and coaxiality of the beams with the optical axes, the actual set-up and alignment is more difficult. Therefore, the slight optical advantage is balanced by the mechanical disadvantages.

Referring now to FIG. 9, there is shown a schematic representation of another embodiment of the invention which is shown in section. A pair of thin glass plates 250 and 252 are held in mount 254. The upper surface 256 of plate 250 and the lower surface 258 of plate 252 are partially and totally reflecting respectively and serve to divide the input beam 260 into a pair of equal intensity output beams 262 and 264. The surfaces 256 and 258 converge in the manner of wedge 200 in FIG. 8 and; therefore, the output beams intersect at the specimen surface 266 of a stereomicroscope. The output beams 262 and 264 are again separated by the angle $\alpha$.

Figure 10:
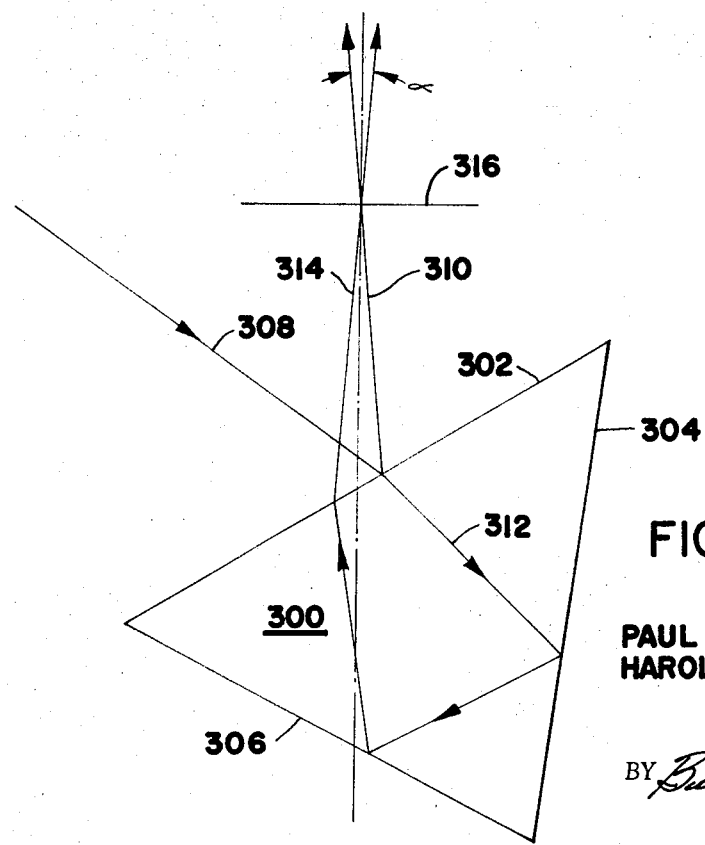
FIG. 10 is a schematic representation of a fifth embodiment of the invention.

Referring now to FIG. 10, there is shown a schematic representation of a device in which there are a plurality of totally reflecting surfaces. A prism 300 having a first face 302 which is partially reflective in the aforementioned manner and a pair of totally reflective faces 304 and 306. An input light beam 308 is partially reflected by surface 302 to form a reflected beam 310 and a transmitted beam 312. The totally reflective faces 304 and 306 are successively oblique to the transmitted beam 312 which is successively reflected thereby and emerges from face 302 to form the second output beam 314. The output beams 310 and 314 intersect in the specimen plane 316 of a stereomicroscope and are separated by the angle $\alpha$.

It will be noted that the various thicknesses and angles may be ascertained by conventional optical technique well known to those skilled in the art. In addition, it can be seen that the number of totally reflective faces and the number of reflections can be multiplied indefinitely within the scope of the invention whether it is desired that the output beams intersect each other or that the output beams intersect the optical axes of the stereomicroscope at the entrance pupils.

While there has been shown and described what are considered to be preferred embodiments of the present invention, it will be obvious to those skilled in the art that various changes and modifications may be made therein without departing from the spirit and scope of the invention.

We claim:

1. In a stereomicroscope having a central mechanical axis, and including a pair of optical systems having optical paths substantially symmetrical about said mechanical axis and intersecting at a point substantially on said mechanical axis and also on a stage, the combination with said stereomicroscope comprising
   a. means providing a source of illumination; and
   b. means on said mechanical axis beyond said stage from said stereomicroscope for selectively directing light emanating from said source upon said point, said light directing means comprising a first plano optical surface and a second plano optical surface, said first plano optical surface reflecting a portion of light emanating from said source along one of said optical paths and transmitting a second portion thereof to said second plano optical surface, said second plano optical surface reflecting said second portion of light through said first optical surface and along the other of said optical paths.

2. The combination of a stereomicroscope having two optical axes extending downward and intersecting substantially at a transparent, horizontal stage, a source of illumination for producing light rays, and optical reflecting means, the combination comprising:
   a. said stereomicroscope;

b. said illumination source disposed to direct said light rays beneath said stage; and c. said optical reflecting means, comprising a first plano surface disposed beneath said stage, said first plano surface being semireflective for reflecting a portion of said rays emanating from said illumination source substantially along one of said optical axes and for transmitting a portion of said rays, and said optical reflecting means further comprising additional plano reflecting means disposed beneath said first plano surface to reflect said transmitted portion of said rays back through said first plano surface and substantially along the other of said optical axes.

3. The combination of claim 2 wherein said optical reflecting means comprises first and second reflective surfaces disposed to direct said rays at a diverging angle toward said stereomicroscope and intersecting said optical axes near the entrance pupils of said stereomicroscope.

4. The combination of claim 3 wherein said optical reflecting means comprises a single optical wedge having two plano faces, one having a semireflective coating and constituting said first plano surface and the other having a totally reflective coating and constituting said additional plano reflective means.

5. The combination of claim 4 further comprising mounting means for said optical reflecting means connected to said stereomicroscope, said mounting means and said optical reflecting means having unique complementary shapes for correct orientation of said optical reflecting means in said mounting means for directing said rays from said illumination source substantially along said two axes of said stereomicroscope.

6. The combination of claim 5 further comprising diffusing means, said diffusing means being disposed adjacent said totally reflective coating of said optical wedge in said mounting means, said mounting means being adjustable for alternate presentation of said optical reflecting means and said diffusing means, and said totally reflective coating being cooperative with said diffusing means for diffuse substage illumination of a subject on said horizontal stage.

7. The combination of claim 3 wherein said optical reflecting means comprises two transparent planoparallel plates disposed at an angle to one another, one of said plates having at least one semireflective surface and constituting said first plano surface and the other having at least one totally reflective surface and constituting said additional plano reflective means.

8. The combination of claim 2 wherein said optical reflecting means comprises first and second reflective surfaces disposed to direct said rays at a converging angle substantially along said axes of said stereomicroscope.

9. The combination of claim 8 wherein said optical reflecting means comprises a single optical wedge having two plano faces, one having a semireflective coating and constituting said first plano surface and the other having a totally reflective coating and constituting said additional plano reflective means.

10. The combination of claim 8 wherein said optical reflecting means comprises two transparent planoparallel plates disposed at an angle to one another, one of said plates having at least one semireflective surface and constituting said first plano surface and the other having at least one totally reflective surface and constituting said additional plano reflective means.

* * * * *